3,355,424
METHOD FOR THE PREPARATION OF AMINO-ALKYLSILOXANE COPOLYMERS
Lawrence H. Brown, Midland, Mich., assignor to Dow Corning Corporation, Midland, Mich., a corporation of Michigan
No Drawing. Filed July 29, 1964, Ser. No. 386,040
18 Claims. (Cl. 260—46.5)

This invention relates to processes for the preparation of polyaminoalkyl-substituted organosiloxane copolymers and salts thereof, and to the reaction products of said processes.

This application is a continuation-in-part of application Ser. No. 28,850, filed May 13, 1960, now abandoned.

This invention relates to a process for the preparation of soluble polyaminoalkyl-substituted organosiloxane copolymers which comprises reacting (1) At least one compound selected from the group consisting of
(A) silanes of the formula $$R''_x(Z_nR')Si(OR)_{3-x}$$

where:

$x$ is an integer of from 0 to 2 inclusive, each R is an alkyl radical of less than 4 carbon atoms,
R' is an aliphatic hydrocarbon radical containing a number of carbon atoms selected from the group consisting of 1, 3, 4 and 5 carbon atoms and having a valence of $n+1$, where $n$ is an integer of from 1 to 3 inclusive,
Z is a monovalent radical attached to R' by a carbon-nitrogen bond and is composed of carbon, nitrogen and hydrogen atoms and contains at least 2 amine groups in which the nitrogen atoms are attached only to substituents selected from the group consisting of hydrogen, and aliphatic hydrocarbon, cycloaliphatic hydrocarbon, and aromatic hydrocarbon radicals, the nitrogen in Z being present only in said amine groups, the ratio of carbon atoms to nitrogen atoms in the substituent —R'$Z_n$ being less than 6:1, and each R'' is a monovalent hydrocarbon radical free of aliphatic unsaturation, and (B) partial hydrolyzates formed by mixing (A) with up to 60 percent of its theoretical equivalent of water, with (2) At least one organosiloxane of the average general formula

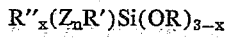

where each

R''' is selected from the group consisting of monovalent hydrocarbon radicals and halogenated monovalent hydrocarbon radicals,
$m$ has a positive average value up to and including 2,
$y$ has an average value of from 1 to 2.5 inclusive, and the sum of $y+m$ has an average value up to and including 3, the value of $m$ being such that the organosiloxane (2) contains at least 1.0% by weight of hydroxyl groups, by contacting (1) and (2) in liquid phase.

More particularly, the invention concerns the process which comprises reacting (1) At least one compound selected from the group consisting of (A) silanes of the formula $$R''_x(Z_nR')Si(OR)_{3-x}$$

where $x$ is an integer of from 0 to 2 inclusive, each R is an alkyl radical of less than 4 carbon atoms, R' is an aliphatic hydrocarbon radical containing a number of carbon atoms selected from the group consisting of 1 and more than 2 carbon atoms and having a valence of $n+1$ where $n$ is an integer of at least 1, Z is a monovalent radical attached to R' by a carbon-nitrogen bond and is composed of carbon, nitrogen and hydrogen atoms and contains at least 2 amine groups, the ratio of carbon atoms to nitrogen atoms in the substituent —R'$Z_n$ being less than 6:1, and each R'' is a monovalent hydrocarbon radical free of aliphatic unsaturation, and (B) partial hydrolyzates formed by mixing (A) with up to 60 percent of its theoretical equivalent of water, with (2) At least one organosiloxane of the average general formula

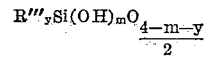

where each R''' is selected from the group consisting of monovalent hydrocarbon radicals and halogenated monovalent hydrocarbon radicals, $m$ has a positive average value up to and including 2, $y$ has an average value of from 1 to 2.5 inclusive, and the sum of $y+m$ has an average value up to and including 3, by contacting (1) and (2) in liquid phase in an amount such that there is at least 10 percent by weight of (1) based on the combined weight of (1) and (2).

The salts of this invention are formed when the reaction product (I) of the above described process is reacted with (II) an acid, by contacting (I) and (II) in liquid phase.

The preparation of the (polyaminoalkyl)alkoxysilanes R''$_x(Z_nR')Si(OR)_{3-x}$ defined above is described in detail in the copending Speier applications Ser. Nos. 723,991 (filed Mar. 26, 1958 and now issued as Patent No. 2,971,-864) and 753,115 and 753,153 (both filed Aug. 4, 1958 and now abandoned after refiling as Ser. No. 176,797 on Mar. 1, 1962, the latter application also being now abandoned), all of which applications are assigned to the assignee of the present invention. The disclosures of the said copending applications are hereby incorporated by reference into the present application. In brief, these silanes can be produced by reacting a polyamine with a halogenohydrocarbonylalkoxysilane where each halogen atom is on a carbon atom at least gamma to the silicon atom. Alternatively, they can be prepared by reacting the polyamine with an alpha-halogenohydrocarbonylalkoxysilane. In these reactions one nitrogen in the polyamine replaces a halogen atom in the halogenohydrocarbon radical, and the halogen acid is given off. The reaction is best carried out at temperatures of from 50° to 200° C. under anhydrous conditions using a molar excess of the polyamine.

The polyamines which can be employed include, for example, the following: ethylenediamine, diethylenetriamine, 1,6-hexanediamine, 3-aminoethyl-1,6-diaminohexane, N,N'-dimethylhexamethylenediamine, cadaverine, piperazine, dl-1,2-propanediamine, methylhydrazine, 1-aminoguanidine, 2-pyrazoline, benzenetriamine, benzenepentamine, benzylhydrazine, N-methyl-p-phenylenediamine, N,N-dimethyl-p-phenylenediamine, and 3-o-tolylenediamine.

It can be readily seen that the polyamine employed can be an aliphatic, cycloaliphatic or aromatic hydrocarbon amine containing at least two amine groups, one of which must contain at least one hydrogen atom. Thus the amine groups in "Z" are those in which the nitrogen atoms are attached only to substituents selected from the group consisting of hydrogen, and aliphatic hydrocarbon, cycloaliphatic hydrocarbon, and aromatic hydrocarbon radicals, the nitrogen in "Z" being present only in said amine groups. The term "poly" in the specification is intended to include compounds or radicals containing two or more amine groups.

The halogenohydrocarbonylsilanes employed in the above described process can themselves be prepared by the well known addition reaction of a halogenated aliphatic hydrocarbon containing at least one unsaturated carbon to carbon linkage, with a halosilane such as that of the formula $R''_xSiHCl_{3-x}$ where $R''$ and $x$ are as previously defined, after which the addition product is alkoxylated by reacting it with one or more alcohols of the formula ROH. Platinum catalysts are preferred for the addition reaction and chloroplatinic acid is particularly suitable. Examples of suitable halogenated hydrocarbons include allylbromide, allyliodide, methallylchloride, propargylchloride, 1-chloro-2-methylbutene -2, 5-bromopentadiene-1,3,16-bromo-2,6-dimethylhexadecene-2, and the like. The halogenohydrocarbons can contain more than one halogen atom, as in 3,4-dibromobutene-1 and 3-chloro-2-chloromethylpropene-1, so that the radicals resulting therefrom can react with more than one amino nitrogen atom, i.e. $n$ can be greater than 1. Preferably there should be no more than one halogen atom per carbon atom. Furthermore, no halogen atom can be so positioned that after the addition of the halogenohydrocarbon to the silicon there is a halogen atom on a carbon atom which is beta to the silicon.

A second method for preparing the halogenohydrocarbonylsilanes described above is that of halogenating an alkylhalosilane with elemental halogen followed by reaction with an alcohol to give the halohydrocarbonylalkoxysilane. This is the method employed when $R'$ in the above formula is a methylene radical.

In the (polyaminoalkyl)alkoxysilane reactants, $R'$ can be any aliphatic hydrocarbon radical containing 1 or more than 2 carbon atoms and having a valence of at least two, i.e. it can include, in any aliphatic configuration, any combination and any number of methyl, vinyl, methylene, vinylene,

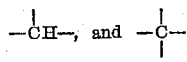

groups within the scope of the claims.

Each Z can be any monovalent radical attached to $R'$ through a carbon-nitrogen linkage, which is composed of hydrogen, carbon and nitrogen atoms, in which preferably all of the nitrogen atoms are present as amine or nitrile groups, and in which there are at least two amine groups per Z radical. The term "amine groups" comprises primary amine, secondary amine (including imine) and tertiary amine groups.

The radical $(R'Z_n)$ can be of any length, so long as the ratio of carbon to nitrogen in the radical is less than 6,1. As a practical matter, the $R'$ radicals will ordinarily contain no more than 18 carbon atoms, and preferably contain 1 or 3 to 5 inclusive carbon atoms. The preferred Z radicals contain from 1 to 8 carbon atoms, and $n$ is preferably 1, 2, or 3.

$R''$ can be any monovalent hydrocarbon radical free of aliphatic unsaturation. Preferably, however, it contains a maximum of 18 carbon atoms. Illustrative examples of suitable $R''$ radicals include alkyl radicals such as methyl, ethyl, propyl, isopropyl, butyl and octadecyl; aryl radicals such as phenyl, xenyl, and naphthyl; alkaryl radicals such as tolyl and xylyl; aralkyl radicals such as benzyl; and cycloaliphatic radicals such as cyclohexyl, methyl, ethyl, and phenyl are most preferred.

The R radicals can be any alkyl radical of less than 4 carbon atoms, i.e., methyl, ethyl, propyl, or isopropyl radicals. Each R, $R'$, $R''$, or Z radical in the above silane reactant can of course be the same as or different from each of its fellow radicals in a single reactant or in a mixture of reactants of a single type, as the case may be.

The partial hydrolyzates (B) defined above are readily prepared by merely mixing the silane (A) with water. The water is used in any amount up to 60 percent of the theoretical equivalent. The "theoretical equivalent" of water is that minimum amount which theoretically would bring about the complete hydrolysis of all of the silicon-bonded alkoxy groups, calculated as though hydrolysis is followed by complete condensation to siloxane linkages. In other words, 1 mol of water is equivalent to 2 mols of alkoxy, as illustrated by the simplified equation:

$$Me_2Si(OR)_2 + H_2O \rightarrow (Me_2SiO) + 2ROH$$

The hydroxylated organosiloxanes (2) employed as the second reactant herein are a well known type of compound. As noted previously, they can be defined as having the average general formula

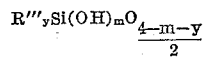

where each $R'''$ is a monovalent hydrocarbon or halogenated monovalent hydrocarbon radical, $m$ has a positive average value up to and including 2, $y$ has an average value of from 1 to 2.5 inclusive, and the sum of $y+m$ has an average value up to and including 3. Examples of suitable $R'''$ radicals include all of the illustrative $R''$ radicals listed above, as well as alkenyl and alkynyl radicals such as vinyl, allyl, cyclohexenyl, and propynyl; and halogenated radicals such as bromophenyl, tetrachlorophenyl, chloroxenyl, $\alpha,\alpha,\alpha$-trifluorotolyl, 1,1,1-trifluoropropyl, and the like. The preferred radicals are methyl, phenyl, and vinyl. Each $R'''$ radical can be the same as or different from its fellow $R'''$ radicals.

The requirement that $y$ in the above formula should have an average value of from 1 to 2.5 does not preclude the presence of some silicon atoms in reactant (2) which have either 0 or 3 $R'''$ radicals attached thereto. In other words, the reactant can be defined as an organosiloxane which consists essentially of polymeric units of the formula

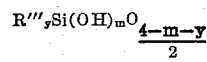

and in such a definition it is obvious that $y$ can be an integer of from 0 to 3 inclusive in any one unit, so long as the average value is from 1 to 2.5 in the polymeric organosiloxane. Preferably the maximum average value for $y$ is 2.1. It is also obvious that in any given unit, $m$ can be 0 so long as it has a positive value in some other unit or units in the polymer. Since there must be siloxane linkages in this polymeric reactant, the sum of $y+m$ in any given unit cannot be more than 3. Preferably the sum of $y+m$ in any particular unit will be from 1 to 3 inclusive, and the average value of this sum in the polymer will necessarily range from greater than 1 up to and including 3. It is most preferred that $m$ does not exceed a value of 1 either in a particular unit or as an average value for the polymer, and that the average value be such that the reactant (2) contains at least 1.0 percent by weight of the silicon-bonded hydroxy groups, with best results being obtained at about 1.8 to 6.0 percent inclusive hydroxy groups.

As is well known in the art, the organosiloxane reactants (2) defined above can be prepared by the hydrolysis or cohydrolysis of the corresponding organohalosilanes or organoalkoxysilanes under conditions such that the condensation of the resulting silanols does not proceed to completion. This technique is preferred where the degree of substitution (i.e. the average value of $y$) is less than about 1.9. A small amount of residual unhydrolyzed alkoxy groups may remain in the siloxane after such a preparation, as is known. These do not hinder the basic reaction, and the use of reactants containing such residual alkoxy groups is intended to be within the scope of this invention.

For higher degrees of substitution, the preferred method for preparing the hydroxylated organosiloxanes is that of contacting the siloxane with an aqueous solution of an acid such as HCl in a closed system until equilibrium is established, then washing the product with water until it is free of acid. The amount of hydroxy groups in the final product is controlled by the concentration of the acid. This technique is set forth in detail in U.S. Patent No. 2,779,776, issued Jan. 29, 1957. Other suitable methods are also known to the art, as, for example, in U.S. Patent No. 2,863,897, issued Dec. 9, 1958 and No. 2,607,792, issued Aug. 19, 1952.

Where the hydroxylated organosiloxane reactant (2) has a degree of substitution (d.s.) less than about 1.9, the reactants and products obtained by this invention are essentially resin-forming in nature. Above a d.s. of 1.9, the reactants and products tend to be fluid in nature. One type of preferred organosiloxane reactant (2) can be defined as consisting essentially of polymeric units of the formula

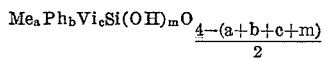

where Me, Ph and Vi represent methyl, phenyl and vinyl radicals respectively, $a$ is an integer of from 0 to 3 inclusive, $b$ is an integer of from 0 to 2 inclusive, $c$ is an integer of from 0 to 1 inclusive, the sum of $a+b+c$ is from 1 to 3 inclusive and has an average value of from 1 to 2.5 inclusive, $m$ is an integer of from 0 to 2 inclusive and has an average value such that (2) contains at least 1 percent by weight hydroxy groups, and the sum of $a+b+c+m$ is an integer of from 1 to 3 inclusive. A particularly preferred specie is a hydroxy end-blocked dimethylpolysiloxane having at least 1.0 percent by weight silicon-bonded hydroxy groups, and preferably from 1.8 to 4.0 percent of such groups.

The reaction of this invention takes place by merely contacting the reactants (1) and (2) in liquid phase. Often it will proceed rather slowly at room temperature, however, so it is preferred to expedite the matter by heating the reaction mixture at, for example, 50° to 200° C., with best results in the range of 65° to 150° C. Heating also tends to drive the reaction toward completion, i.e. toward the formation of the maximum number of new siloxane linkages, particularly when the by-produced alcohol is removed. The reaction, in simplified form, is illustrated by the following equation

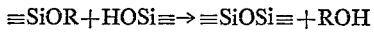

The reaction appears to be "self-catalyzed" by the polyaminoalkyl substituents present in reactant (1). These substituents also catalyze the condensation of silicon-bonded hydroxy groups, however, so when the d.s. of the system is in the resin-forming area (i.e., below about 1.9) it is preferred that the reaction and the reaction product be kept in an inert solvent to prevent or retard gelation. Any inert organic solvent (e.g. hydrocarbons such as benzene, toluene, xylene, mineral spirits, etc.) can be used, but it is preferred that water soluble organic solvents be employed. Examples are the various well known water soluble ethers (e.g., dioxane), ketones (e.g. acetone), esters (methylcellosolve acetate, methyl acetate, ethylene glycol diacetate), and alcohols (methanol, ethanol, 2-propanol).

The alcohol which is formed in this reaction can be removed by distillation, thus it is certain that true copolymers are formed. It will be readily apparent that the copolymer can have unreacted (OR) and/or (OH) groups present, depending upon the relative amounts of the two reactants and the amount of (OR) or (OH) present in the reactants initially. If desired, any excess (OR) groups present can be hydrolyzed by the addition of water to the system, and control of the amount of water so added controls the amount of such groups which remain in the copolymer. Preferred products are obtained when water equivalent to at least 80 to 100 percent of any excess (OR) groups present is used. Any amount of water in excess of this can be used, but ordinarily there is no benefit in using any more than about 110 percent of the theoretical equivalent. Any excess (OH) groups present in the product can be caused to condense, as for example by heating the copolymer. Any or all of the alcohol formed by either the initial reaction or any subsequent hydrolysis can be left in the reaction product, if desired. In aqueous and/or alcoholic solutions or dispersions, the copolymer actually is in a state of equilibrium, and determination of the precise amounts of silicon-bonded (OH) or (OR) present is ordinarily not feasible.

The reactants are employed in an amount such that there is at least 0.001 percent by weight, and preferably at least 1%, of the polyaminoalkyl-substituted reactant (1) based on the combined weight of (1) and (2). Any excess of (1) can be used. However, most preferably the weight ratio of (1) to (2) will line in the range of from 1:9 to 9:1, and the most interesting products have been obtained where the ratio ranges from 2:8 to 8:2. Since reactant (1) can contain varying amounts of nitrogen, depending upon its exact structure, obviously the amount of nitrogen in the copolymeric product can vary accordingly for differing (1) reactants. As noted above, it is most preferable that at least 10 percent by weight of (1) be used, but in addition to this it is preferred that the amount of (1) be adjusted according to its particular structure so that the resulting copolymer contains at least 1.8 percent nitrogen by weight.

It will be seen that a number of variations of the basic reaction are possible, considering that solvent may or may not be present, that added water may or may not be used, that if water is used it can be added at different stages in the process, and that the hydroxylated siloxane reactant (2) can be formed in situ by using, for example, an alkoxysilane and water. The choice of the best process will vary with the type and relative amounts of reactants as well as with the extent of hydroylsis and/or condensation desired in the final product. Examples of important variations are as follows, where for simplicity the polyaminoalkyl-substituted reactant and the hydroxylated organosiloxane reactant are referred to as (1) and (2) respectively:

A. Mixture of (1), (2), and solvent is made. Water is then added and mixture is heated at reflux. Used for solid (2) at high content of (1).

B. Mixture of (1), (2), and solvent is heated at reflux. Used for solid (2), usually at lower (1) content. Gives greater shelf stability, lower viscosity than A.

C. Mixture of (1), (2), and solvent is heated at reflux, then water and optional additional solvent are added and reflux continued. Optional process for A, gives better water solubility.

D. Mixture of (1) and (2) is heated, then water and solvent added and mixture refluxed, optionally stripping out formed alcohol and solvent. Used with (2) which is a fluid or high d.s. resin.

E. Mixture of (1) and (2) is heated, cooled, and optional solvent added. Used where (2) is fluid. Alternatively, mixture of (1) and (2) is allowed to stand at room temperature for 2 to 6 hours.

The salts of this invention are formed by reacting any of the above described copolymeric reaction products of (1) and (2) with an acid. The reaction takes place when the copolymer and the acid are merely contacted in liquid phase. The acid can be inorganic or organic. Examples of suitable inorganic acids include hydrochloric, hydrobromic, nitric, sulfuric, and carbonic acids. Any organic acid can be used, but it is preferred to employ those which have no more than 8 total carbon atoms and which have a ratio of no more than 5 (preferably no more than 4) noncarboxylic carbon atoms for each carboxylic carbon atom. The acids can be monocarboxylic, as in formic, acetic, propanoic, butyric (i.e. butanoic), valeric (pentanoic), and caproic (hexanoic) acids, including branched chain acids such as pivalic (trimethylacetic); or polycarboxylic as in oxalic, malonic, succinic, glutaric, adipic and pimelic acids. Hydroxy aids are also suitable, as exemplified by latic, malic (hydroxylsuccinic) and tartaric acids. Citric acid is a suitable hydroxylated tricarboxylic acid. Aromatics such as phthalic, isophthalic, and terephthalic acids can be used. Unsaturated acids also can be used, maleic acid being a preferred example. Halogenated acids such as trichloro- and trifluoroacetic are also suitable. Any other substituent groups can be present in the acid, but it is preferable that the carboxylic groups are the only groups present which are reactive toward the amino-substituents present in the organosiloxane.

One of the major reasons for preparing salts of the defined copolymeric reaction products lies in the fact that the salt form is ordinarily more water soluble than its parent compound. To enhance this effect, it is preferred to prepare the salt from an acid which is itself water soluble to an appreciable extent. However, even acids which are only very slightly soluble (such as caproic) produce salts which are more soluble than the starting organosiloxane. The salts tend to have a greater stability in storage (i.e., "shelf life") than their parent compounds, and are also useful in any situation where the alkalinity of the original amine groups is undesirable.

The amount of acid employed will ordinarily be that which just neutralizes the aminoalkyl-substituted organosiloxane. In other words, ordinarily the acid will be used in an amount to provide about one equivalent of acid for each amine nitrogen atom present in the organosiloxane. Of course any amount less than this can be used, if desired, to provide a "partial salt" having solubility characteristics intermediate between the organosiloxane per se and the "full salt." Such a partial salt is meant to be included within the scope of the term "acid salt" as it is employed herein. An excess of acid over the equivalent amount can also be used, subject only to the practical limitation imposed by any harm which a large excess of acid might do to any system in which the salt is to be used.

The copolymers and salts prepared in accordance with this invention are generally water-miscible materials. The term "water-miscible" is used herein as inclusive of both water soluble and "self-emulsifiable" materials. In general, the salts defined herein are truly water soluble in the usual sense of that term. The same is also true of those copolymers which are not salts but which contain a sufficient amount of the polyaminoalkyl-substituted polymeric units to impart water solubility. In a dimethylsiloxane copolymer salt system, for example, those copolymers which contain at least 20 to 25 percent by weight of the polyaminoalkyl-substituted units will generally be truly water soluble. Copolymer salts containing a lesser amount of polyaminoalkyl-substituted units, e.g. 10 to 20 percent in the aforesaid dimethylsiloxane copolymer system, are generally "self-emulsifiable." By this it is meant that the latter copolymers do not form true solutions, but do form stable emulsions with water even in the absence of any added emulsifying agent, i.e., no third ingredient is necessary to form an emulsion.

In the absence of any inert solvent, some of the fluid copolymers of this invention tend to gel in a matter of hours or days. This effect can be retarded either by storing the copolymer in solution in a solvent such as an alcohol, or by converting the copolymer to a salt. Even the alcoholic solutions of the salt forms of these copolymers may gel in a matter of months, however, and the most stable and hence preferred form for storage is as a solution of the salt in the alcohol (or other water-soluble solvent).

One major utility of the copolymers and salts of this invention is as sizing agents on textile materials, including glass fiber products. A prime coating of these products improves the ease and degree of coloring obtainable from the application of dyes or pigments to fabrics which are otherwise difficult or impossible to color. Such uses are described in detail in the copending application of John L. Speier filed concurrently herewith and entitled "Process for Dyeing Textile Fibers" (Ser. No. 28,851). The products of this invention are also useful as emulsifying agents for conventional organosiloxane fluids. Those products having a degree of substitution in the lower ranges (e.g., 1 to 1.9) are resinous or resin-forming in nature, and can be used as coating, impregnating, or laminating resins and the like, in the same manner as the well known commercial silicone resins. The presence of the polyaminoalkyl substituents in such resins makes them easier to cure, and in fact renders many of the "air-drying" so they will cure at room temperature.

In the following examples, which are illustrative only, all parts and percentages are by weight unless otherwise specified. The symbols Me, Et, Pr, Vi, and Ph have been used to represent methyl, ethyl, propyl, vinyl, and phenyl radicals respectively.

*Example 1*

A mixture was prepared containing 75 g.

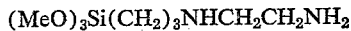

and 25 g. of a polymer having the formula

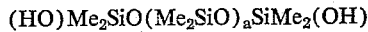

where the average value of $a$ was such that the polymer contained 3.5 percent by weight of (OH) groups. Such a mixture contains about 1.01 mols (OMe) groups and 0.05 mol (OH) groups. The mixture was heated to 150° C. under a reflux condenser, cooled, then 8.65 g. $H_2O$ (0.48 mol, equivalent to the 0.96 molar difference between the OMe and OH groups) was added, followed by 75 g. EtOH (sufficient to provide a solution of about 50 percent of the theoretical organosiloxane product). About one third of the alcohol was removed by distillation and then the product was readjusted to a 50 percent concentration. The resulting ethanol solution was completely soluble in water, and the copolymer product present therein contained about 75 percent.

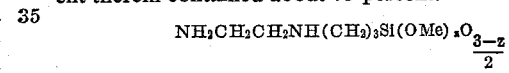

units and 25 percent $Me_2SiO$ units by weight. The value of $z$ in this copolymeric solution could not be measured because of the alcohol present as solvent, but theoretically would range between 0 and 1. When the alcoholic solution of such a copolymer is itself dissolved in water, a major portion of any residual silicon-bonded methoxy groups are hydrolyzed. When such an aqueous solution is dried, hydrolysis and condensation of the copolymer become substantially complete so that the copolymer then consists essentially of only $Me_2SiO$ and

units. An aqueous solution containing 1 percent of the coplymer was applied to a glass fiber textile. The textile was dried 20 minutes at 225° F., and it was then possible to color it with various pigments or dyes, using conventional techniques. Acid dyes were found to give best results. Color was retained by the glass even after laundering.

A salt of a copolymer prepared exactly as above was prepared by adding 40.5 g. glacial acetic acid (0.676 mol) to the cool 50 percent alcohol solution, thus providing 1 mol of acid for each gram atom of nitrogen present in the copolymer. The alcoholic solution of the salt was completely soluble in water. Treatment of glass fiber textiles with aqueous solutions of the salt made it possible to dye them in the same manner as described above, where the original copolymer was used.

Copolymers and salts similar to those specifically illustrated above were made from the same reactants by the same technique, but using ratios of 10/90, 25/75, 50/50, and 90/10 in place of the 75/25 ratio described above. Related 50/50 copolymers were prepared by the same technique, except that

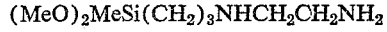

(MeO)$_3$Si(CH$_2$)$_3$NHCH$_2$CH$_2$N(CH$_2$CH$_2$CN)$_2$ were used in place of the (MeO)$_3$Si(CH$_2$)$_3$NHCH$_2$CH$_2$NH$_2$ reactant.

*Example 2*

A mixture was prepared of 362 g.

(MeO)$_3$Si(CH$_2$)$_3$NHCH$_2$CH$_2$NH$_2$ and 1085 g. of a fluid polymer having the formula (HO)Me$_2$SiO(Me$_2$SiO)$_a$SiMe$_2$(OH)

where *a* had an average value such that the polymer contained 3.09 percent (OH) groups. The latter type of polymer is known as a "hydroxy end-blocked dimethylpolysiloxane," and this mixture represented a 25/75 ratio of aminosilane to polymer. The mixture was agitated intermittently for 3 hours, during which time the exothermic reaction which took place raised its temperature from the initial 24° C. to a final 31° C. The reaction product was diluted with 550 g. isopropanol, and to the resulting solution there was added a solution of 203 g. glacial acetic acid in 1100 g. isopropanol (representing a stoichiometric amount of acid and sufficient alcohol to provide about a 50 percent concentration of nonvolatiles). The alcoholic solution of this salt was soluble in water, and application of the aqueous solution to glass cloth made it possible to dye the glass as in Example 1.

When the above process is repeated except that equivalent amounts of hydrochloric, hydrobromic, nitric, sulfuric, formic, propanoic, malic, adipic, trifluoroacetic, or isophthalic acids are used in place of the acetic acid, comparable salts are produced.

*Example 3*

A mixture was made of 500 g.

(MeO)$_3$Si(CH$_2$)$_3$NHCH$_2$CH$_2$NH$_2$ and 1500 g. of the hydroxy end-blocked dimethylpolysiloxane containing 3.09 percent (OH) groups. The temperature rose from 27° C. to 35° C. in 3 minutes from the exothermic reaction. The mixture was heated up to 152° C. over a period of 105 minutes, during which time 83.5 g. of the by-product MeOH was removed. The resulting viscous mass was cooled to 50° C. and diluted with 800 g. ethanol, then 270 g. glacial acetic acid in about 1,000 g. EtOH was added. The alcoholic solution of the salt so produced was water soluble, and acted as a mordant for dyeing glass cloth in the same manner as the products of Examples 1 and 2.

*Example 4*

When a mixture of 190 g.

Me$_2$(MeO)Si(CH$_2$)$_3$NHCH$_2$CH$_2$NH$_2$ and 556 g. of a hydroxy end-blocked dimethylpolysiloxane containing 3.06 percent (OH) groups is reacted as in Example 3, diluted to 50 percent solids with ethanol, and converted to a salt by the addition of 120 g. glacial acetic acid, a water soluble product is obtained.

*Example 5*

A partial hydrolyzate of (MeO)$_3$Si(CH$_2$)$_3$NHCH$_2$CH$_2$NH$_2$ was prepared by mixing 92 g. of this amine with 4.5 g. water (about 40 percent of the theoretical amount for complete hydrolysis). When this partial hydrolyzate is reacted with 230 g. of the dimethylpolysiloxane of Example 3 by the method of that example, diluted to 50 percent solids with ethanol, and converted to the salt by the addition of 50 g. glacial acetic acid, the solution of product is water soluble.

*Example 6*

When the process of Example 3 is repeated except that hydroxy end-blocked copolymers of 10 mol percent (BrC$_6$H$_4$)MeSiO, 10 mol percent PhMeSiO and 80 mol percent Me$_2$SiO units, or of 5 mol percent (Cl$_2$C$_6$H$_3$)MeSiO and 95 mol percent Me$_2$SiO units (both copolymers containing about 3 percent (OH) groups) are used in place of the dimethylpolysiloxane, the resulting alcoholic solutions of the acetate salt are water soluble.

*Example 7*

An organosiloxane hydrolyzate having a high hydroxy content and a d.s. of 1 was prepared by adding a mixture of 70 mol percent PhSiCl$_3$ and 30 mol percent PrSiCl$_3$ to a stirred mixture of ice water (sufficient to provide a theoretical 15 percent HCl concentration upon completion of the hydrolysis), methanol (3 mols per mol of silane), and toluene (sufficient to provide 30 percent silicone solids in final toluene solution). The organic layer was separated, washed, and volatiles stripped off to a temperature of 110° C. The residue was stirred with additional water (5 percent of the weight of the starting chlorosilanes), and then all solvent was removed by distillation to a pot temperature of 150° C. at 20 mm. Hg pressure. The product was a solid resin, and contained 6 percent silicon-bonded hydroxy groups.

Heat and agitation were applied to a mixture of 1200 g. of the above solid resin and 1200 g. ethanol until the resin dissolved. To this solution there was added 400 g. (MeO)$_3$Si(CH$_2$)$_3$NHCH$_2$CH$_2$NH$_2$, causing an exothermic rise in temperature from the starting 39° C. to a final 44° C. The resulting solution was heated at reflux (about 76° C.) for 3 hours, then cooled and diluted to about 45.5 percent solids by the addition of 400 g. ethanol. This reaction product was found to be compatible with alcohol-soluble phenolic laminating varnishes, thus providing a convenient means for the silicone modification of such varnishes. (In general, commercial silicone resins are not compatible with these phenolics.) The reaction product was also compatible with conventional organo-siloxane coating resins, and was found to have a catalytic effect on the curing thereof. For example, one conventional resin (containing about 55 mol percent PhMeSiO, 30 mol percent MeSiO$_{1.5}$, and 15 mol percent PhSiO$_{1.5}$ units) ordinarily requires about 4 hours at 250° C. for curing and cannot be cured at room temperature, but when 90 parts of this resin was blended with 10 parts of the above reaction product (the ratio being on a resin solids basis), the mixture was found to cure in about 24 hours at room temperature.

Another batch of the aminosilane-organosiloxane hydrolyzate reaction product was prepared as above, and diluted to 35 percent solids with ethanol. This solution was mixed with 203 g. glacial acetic acid, to produce the acetate salt. The resulting ethanol solution of the salt product was soluble in water. It was also soluble in, and compatible with, alcohol soluble phenol-formaldehyde laminating varnishes which contained unreacted methylol groups, thus providing silicone modified phenolic varnishes.

*Example 8*

Another organosiloxane hydrolyzate was prepared by the technique used in making the hydrolyzate of Example 7, but the mixture of silanes used for hydrolysis was composed of 20 mol percent PhMeSiCl$_2$, 30 mol percent MeSiCl$_3$, 40 mol percent PhSiCl$_3$, and 10 mol percent Ph$_2$SiCl$_2$. The solvent-free hydrolyzate was a viscous liquid containing about 2.5 percent (OH) groups. A solution of 300 g. of this hydrolyzate in 300 g. EtOH was mixed with 100 g. (MeO)$_3$Si(CH$_2$)$_3$NHCH$_2$CH$_2$NH$_2$, producing a rise in temperature from 22° C. to 30° C. in 2 minutes. A solution of 14 g. H$_2$O in 25 g. EtOH was added and the mass was refluxed for 3 hours. The solution was cooled and 42.3 g. of 98 percent formic acid was added. The resulting alcoholic salt solution was soluble in water. When used as a coating resin, the aqueous solution deposited a film which cured in 10 minutes at 100° C. to a tough, flexible coating which was more solvent resistant than the unmodified silicone resin.

*Example 9*

When the process of Example 8 is repeated except that the hydrolyzate is prepared from a mixture of 20 mol percent PhMeSiCl$_2$, 25 mol percent MeSiCl$_3$, 5 mol percent ViSiCl$_3$, 40 mol percent PhSiCl$_3$, 9 mol percent Ph$_2$SiCl$_2$, and 1 mol percent Me$_3$SiCl, a comparable water soluble product is obtained.

*Example 10*

A mixture of 45 mol percent Me$_2$SiCl$_2$, 30 mol percent Ph$_2$SiCl$_2$, and 25 mol percent PhSiCl$_3$ was added to a stirred hydrolysis mixture containing methylisobutylcarbinol (0.25 mol per mol silane), toluene (to provide 30 percent solids of theoretical silicone in final toluene solution), and water (sufficient to provide theoretical 15 percent HCl solution). The hydrolyzate was washed and solvent removed by distillation to provide a solvent-free liquid product having a viscosity of 9400 cs. at 25°C. and containing 3.75 percent (OH) groups. A mixture of 70 parts of this hydrolyzate and 30 parts of (MeO)$_3$Si(CH$_2$)$_3$NHCH$_2$CH$_2$NH$_2$ was heated to about 100° C., then cooled, diluted with 100 parts EtOH and 2 parts H$_2$O, and heated at reflux temperature for 3 hours. The reaction product was then cooled and a salt was formed by adding 16.2 parts glacial acetic acid. The salt solution was water soluble.

*Example 11*

When (EtO)$_2$EtSi(CH$_2$)$_3$NHCH$_2$CH$_2$NH$_2$
(EtO)$_2$PhSi(CH$_2$)$_3$NHCH$_2$CH$_2$NH$_2$
(MeO)$_3$SiCH$_2$CH$_2$CHNHCH$_2$CH$_2$NH$_2$, (MeO)$_3$SiCH$_2$NHC$_6$H$_4$NMe$_2$
                        |
                        CH$_2$NHCH$_2$CH$_2$NH$_2$
(MeO)$_3$Si(CH$_2$)$_3$NH(CH$_2$)$_6$NH$_2$, (MeO)$_3$Si(CH$_2$)$_3$NHC$_6$H$_3$(NH$_2$)$_2$ or (MeO)$_3$Si(CH$_2$)$_3$NMe(CH$_2$)$_6$NHMe is substituted for the (MeO)$_3$Si(CH$_2$)$_3$NHCH$_2$CH$_2$NH$_2$ used in the preparation of the copolymers shown in Example 1, using an equivalent molar amount in each case, the resulting copolymers and salts are comparable in their properties to those obtained in Example 1.

*Example 12*

A mixture of 1776 g. of a hydroxy end-blocked dimethylpolysiloxane containing about 4 percent hydroxyl groups and 134 g. of (CH$_3$O)$_3$Si(CH$_2$)$_3$NHCH$_2$CH$_2$NH$_2$ was prepared and allowed to stand for 3 hours with intermittent shaking. Then a mixture of 75.4 g. of glacial acetic acid and 269 g. of isopropanol was added to the above mixture and mixed in by shaking. The resulting mixture was then allowed to stand for one-half hour with shaking every 5–10 minutes. Then 1000 g. of isopropyl alcohol was added.

The resulting product was essentially an isopropanol solution of the acetate salt of a copolymer consisting of (CH$_3$)$_2$SiO units and H$_2$NCH$_2$CH$_2$NH(CH$_2$)$_3$SiO$_{3/2}$ units.

*Example 13*

When a mixture of a hydrolyzate formed by mixing 50 percent of the theoretical equivalent of water with 10 g. of H$_2$NCH$_2$CH$_2$NHCH$_2$CH(CH$_3$)CH$_2$Si(OCH$_3$)$_3$ and 190 g. of a hydroxyl endblocked dimethylpolysiloxane containing about 4% hydroxyl groups is heated in liquid phase at a temperature of about 100° C., a copolymer consisting of NH$_2$CH$_2$CH$_2$NHCH$_2$CH(CH$_3$)CH$_2$SiO$_{3/2}$ units and (CH$_3$)$_2$SiO units is obtained.

*Example 14*

When 2 g. of H$_2$NCH$_2$CH$_2$NH(CH$_2$)$_3$Si(OCH$_3$)$_3$ and 198 g. of the hydroxyl endblocked dimethylpolysiloxane are substituted for the materials of Example 13, a copolymer consisting of H$_2$NCH$_2$CH$_2$NH(CH$_2$)$_3$SiO$_{3/2}$ units and (CH$_3$)$_2$SiO units is obtained.

That which is claimed is:

1. A process for the preparation of polyaminoalkyl-substituted organosiloxane copolymers which comprises reacting
   (1) At least one compound selected from the group consisting of
       (A) silanes of the formula R″$_x$(Z$_n$R′)Si(OR)$_{3-x}$, where:
           $x$ is an integer of from 0 to 2 inclusive, each R is an alkyl radical of less than 4 carbon atoms,
           R′ is an aliphatic hydrocarbon radical containing a number of carbon atoms selected from the group consisting of 1, 3, 4 and 5 carbon atoms and having a valence of $n+1$, where $n$ is an integer of from 1 to 3 inclusive,
           Z is a monovalent radical attached to R′ by a carbon-nitrogen bond and is composed carbon, nitrogen and hydrogen atoms and contains at least 2 amine groups in which the nitrogen atoms are attached only to substituents selected from the group consisting of hydrogen, and aliphatic hydrocarbon, cycloaliphatic hydrocarbon, and aromatic hydrocarbon radicals, the nitrogen in Z being present only in said amine groups, the ratio of carbon atoms to nitrogen atoms in the substituent —R′Z$_n$ being less than 6:1, and each R″ is a monovalent hydrocarbon radical free of aliphatic unsaturation, and
       (B) partial hydrolyzates formed by mixing (A) with up to 60 percent of its theoretical equivalent of water, with
   (2) At least one organosiloxane of the average general formula R‴$_y$Si(OH)$_m$O$_{\frac{4-m-y}{2}}$ where each
       R‴ is selected from the group consisting of monovalent hydrocarbon radicals and halogenated monovalent hydrocarbon radicals,
       $m$ has a positive average value up to and including 2,
       $y$ has an average value of from 1 to 2.5 inclusive, and the sum of $y+m$ has an average value up to and including 3, the value of $m$ being such that the organosiloxane (2) contains at least 1.0% by weight of hydroxyl groups,
   by contacting (1) and (2) in liquid phase in an amount such that there is at least 10 percent by weight of (1) based on the combined weight of (1) and (2).

2. A process in accordance with claim 1 further characterized in that the copolymeric reaction product (I) of the process of claim 1 is reacted with (II) an acid selected from the group consisting of hydrochloric, hydrobromic, nitric, sulfuric, and carbonic acids and organic acids having a ratio of no more than 5 noncarboxylic carbon atoms for each carboxylic carbon atom, by contacting (I) and (II) in liquid phase, whereby the corresponding acid salt is produced.

3. A process for the preparation of polyaminoalkyl-substituted organosiloxane copolymers which comprises reacting
   (1) a compound of the formula $(RO)_3Si(CH_2)_3NHCH_2CH_2NH_2$ where each R is an alkyl radical of less than 4 carbon atoms, with
(2) an organosiloxane compound of the average general formula $$R'''_y Si(OH)_m O_{\frac{4-m-y}{2}}$$

where each
R''' is selected from the group consisting of monovalent hydrocarbon radicals and halogenated monovalent hydrocarbon radicals,
y has an average value of from 1 to 2.5 inclusive,
m has a positive average value up to and including 2, and the sum of y+m has an average value up to and including 3, the value of m being such that the organosiloxane (2) contains at least 1.0% by weight of hydroxyl groups,
by contacting (1) and (2) in liquid phase in an amount such that there is at least 10 percent by weight of (1) based on the combined weight of (1) and (2), and such that there is an excess of (OR) groups in (1) over the (OH) groups in (2); adding an amount of water which is at least equivalent to the molar difference between the OH groups present in (2) and the OR groups present in (1), and heating the mixture at a temperature of at least 65° C.

4. A process in accordance with claim 3 further characterized in that the copolymeric reaction product (I) of the process of claim 3 is reacted with (II) a water soluble acid selected from the group consisting of (A) inorganic acids from the group hydrochloric, hydrobromic, nitric, sulfuric, and carbonic acids, and (B) organic acids having a ratio of no more than 5 noncarboxylic carbon atoms for each carboxylic carbon atom, by contacting (I) and (II) in liquid phase.

5. A process for the preparation of polyaminoalkyl-substituted organosiloxane copolymers which comprises reacting
(1) the hydrolyzate formed by mixing up to 60 percent of the theoretical equivalent of water wtih a compound of the formula $(RO)_3Si(CH_2)_3NHCH_2CH_2NH_2$ where each R is an alkyl radical of less than 4 carbon atoms, with
(2) an organosiloxane consisting essentially of polymeric units of the formula $$R'''_y Si(OH)_m O_{\frac{4-m-y}{2}}$$

where
m is an integer of from 0 to 2 inclusive and has an average value such that (2) contains at least 1.0 percent by weight hydroxy groups,
y is an integer of from 0 to 3 inclusive and has an average value of from 1.0 to 2.5 inclusive, the sum of y+m being from 1 to 3 inclusive, and each
R''' is selected from the group consisting of monovalent hydrocarbon radicals and halogenated monovalent hydrocarbon radicals,
by mixing (1) and (2) and heating the mixture in liquid phase at a temperature of at least 65° C., the proportions of (1) and (2) being such that there is at least 10 percent by weight of (1) based on the combined weight of (1) and (2).

6. A process for the preparation of polyaminoalkyl-substituted organosiloxane copolymers which comprises reacting
(1) a compound of the formula $(RO)_3Si(CH_2)_3NHCH_2CH_2NH_2$ where each R is an alkyl radical of less than 4 carbon atoms, with
(2) a hydroxy end-blocked dimethylpolysiloxane having from 1.0 to 6 percent by weight silicon-bonded hydroxy groups, the weight ratio of (1) and (2) being from 1:9 to 9:1,
by mixing (1) and (2) and heating the mixture in liquid phase to at least 65° C.

7. A process for the preparation of polyaminoalkyl-substituted organosiloxane copolymers which comprises mixing, in liquid phase,
(1) a compound of the formula $(RO)_3Si(CH_2)_3NHCH_2CH_2NH_2$ where each R is an alkyl radical of less than 4 carbon atoms, with
(2) a hydroxy end-blocked dimethylpolysiloxane having from 1.0 to 6 percent by weight silicon-bonded hydroxy groups,
in a ratio such that there is an excess of (OR) groups in (1) over the hydroxy groups in (2); heating the mixture to at least 65° C.; and then adding water in an amount at least equivalent to the excess of (OR) groups.

8. A process in accordance with claim 7 further characterized in that the copolymeric reaction product (I) of the process of claim 7 is reacted with (II) a water soluble acid selected from the group consisting of (A) inorganic acids from the group hydrochloric, hydrobromic, nitric, sulfuric, and carbonic acids, and (B) organic acids having a ratio of not more than 5 noncarboxylic carbon atoms for each carboxylic carbon atom, by contacting (I) and (II) in liquid phase.

9. A process in accordance with claim 7 wherein the copolymeric reaction product of the process defined in that claim is dissolved in a water soluble organic solvent selected from the group consisting of water soluble ethers, ketones, esters, and alcohols.

10. A process for the preparation of polyaminoalkyl-substituted organosiloxane copolymers which comprises reacting
(1) a compound of the formula $(RO)_3Si(CH_2)_3NHCH_2CH_2NH_2$ where each R is an alkyl radical of less than 4 carbon atoms, with
(2) an organosiloxane consisting essentially of polymeric units of the formula $$Me_a Ph_b Vi_c Si(OH)_m O_{\frac{4-(a+b+c+m)}{2}}$$

where
Me, Ph and Vi represent methyl, phenyl and vinyl radicals respectively,
a is an integer of from 0–3 inclusive,
b is an integer of from 0–2 inclusive,
c is an integer of from 0–1 inclusive, the sum of a+b+c is an integer of from 1 to 3 inclusive and has an average value of from 1 to 2.5 inclusive,
m is an integer of from 0 to 2 inclusive and has an average value such that (2) contains at least 1 percent by weight hydroxy groups, and the sum of a+b+c+m is an integer of from 1 to 3 inclusive,
by mixing (1) and (2) and heating the mixture in liquid phase at a temperature of at least 65° C., the proportions of (1) and (2) being such that there is at least 10 percent by weight of (1) based on the combined weight of (1) and (2).

11. A process for the preparation of soluble polyaminoalkyl-substituted organosiloxane copolymers which comprises reacting
(1) at least one compound selected from the group consisting of
(A) silanes of the formula $R''_x(Z_n R')Si(OR)_{3-x}$, where $x$ is an integer of from 0 to 2 inclusive, each R is an alkyl radical of less than 4 carbon atoms, R' is an aliphatic hydrocarbon radical containing a number of carbon atoms selected from the group consisting of 1, 3, 4 and 5 carbon atoms and having a valence of $n+1$ where $n$ is an integer of from 1 to 3 inclusive, Z is a monovalent radical attached to R' by a carbon-nitrogen bond and is composed of carbon, nitrogen and hydrogen atoms and contains at least 2 amine groups in which the nitrogen atoms are attached only to substituents selected from the group consisting of hydrogen, and aliphatic hydrocarbon, cycloaliphatic hydrocarbon, and aromatic hydrocarbon radicals, the nitrogen in Z being present only in said amine groups, the ratio of carbon atoms to nitrogen atoms in the substituent —R'Z$_n$ being less than 6:1, and each R'' is a monovalent hydrocarbon radical free of aliphatic unsaturation, and (B) partial hydrolyzates formed by mixing (A) with up to 60 percent of its theoretical equivalent of water, with (2) at least one organosiloxane of the average general formula

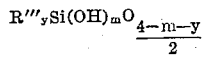

where each R''' is selected from the group consisting of monovalent hydrocarbon radicals and halogenated monovalent hydrocarbon radicals, $m$ has a positive average value up to and including 2, $y$ has an average value of from 1 to 2.5 inclusive, and the sum of $y+m$ has an average value up to and including 3, the value of $m$ being such that the organosiloxane (2) contains at least 1.0% by weight of hydroxyl groups, by contacting (1) and (2) in liquid phase.

12. A process in accordance with claim 11 further characterized in that the copolymeric reaction product (I) of the process of claim 11 is reacted with (II) an acid selected from the group consisting of hydrochloric, hydrobromic, nitric, sulfuric, and carbonic acids and organic acids having a ratio of no more than 5 non-carboxylic carbon atoms for each carboxylic carbon atom, by contacting (I) and (II) in liquid phase, whereby the corresponding acid salt is produced.

13. A process for the preparation of soluble polyaminoalkyl-substituted organosiloxane copolymers which comprises reacting (1) a compound of the formula

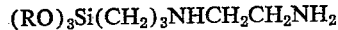

where each R is an alkyl radical of less than 4 carbon atoms, with (2) an organosiloxane compound of the average general formula

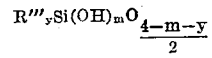

where each R''' is selected from the group consisting of monovalent hydrocarbon radicals and halogenated monovalent hydrocarbon radicals, $y$ has an average value of from 1 to 2.5 inclusive, $m$ has a positive average value up to and including 2, and the sum of $y+m$ has an average value up to and including 3, the value of $m$ being such that the organosiloxane (2) contains at least 1.0% by weight of hydroxyl groups, by contacting (1) and (2) in liquid phase in an amount such that there is an excess of (OR) groups in (1) over the (OH) groups in (2); adding an amount of water which is at least equivalent to the molar difference between the OH groups present in (2) and the OR groups present in (1), and heating the mixture at a temperature of at least 65° C.

14. A process in accordance with claim 13 further characterized in that the copolymeric reaction product (I) of the process of claim 13 is reacted with (II) a water soluble acid selected from the group consisting of (A) inorganic acids from the group hydrochloric, hydrobromic, nitric, sulfuric, and carbonic acids, and (B) organic acids having a ratio of no more than 5 non-carboxylic carbon atoms for each carboxylic carbon atom, by contacting (I) and (II) in liquid phase.

15. A process for the preparation of soluble polyaminoalkyl-substituted organosiloxane copolymers which comprises reacting (1) the hydrolyzate formed by mixing up to 60 percent of the theoretical equivalent of water with a compound of the formula

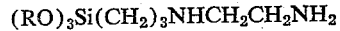

where each R is an alkyl radical of less than 4 carbon atoms, with (2) an organosiloxane consisting essentially of polymeric units of the formula

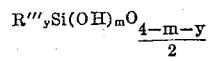

where $m$ is an integer of from 0 to 2 inclusive and has an average value such that (2) contains at least 1.0 percent by weight hydroxy groups, $y$ is an integer of from 0 to 3 inclusive and has an average value of from 1.0 to 2.5 inclusive, the sum of $y+m$ being from 1 to 3 inclusive, and each R''' is selected from the group consisting of monovalent hydrocarbon radicals and halogenated monovalent hydrocarbon radicals, by mixing (1) and (2) and heating the mixture in liquid phase at a temperature of at least 65° C.

16. A process for the preparation of soluble polyaminoalkyl-substituted organosiloxane copolymers which comprises reacting (1) a compound of the formula

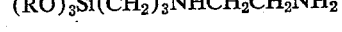

where each R is an alkyl radical of less than 4 carbon atoms, with (2) a hydroxy end-blocked dimethylpolysiloxane having from 1.0 to 6 percent by weight silicon-bonded hydroxy groups, by mixing (1) and (2) and heating the mixture in liquid phase to at least 65° C.

17. A process in accordance with claim 16 further characterized in that the copolymeric reaction product (I) of the process of claim 16 is reacted with (II) a water soluble acid selected from the group consisting of (A) inorganic acids from the group hydrochloric, hydrobromic, nitric, sulfuric, and carbonic acids, and (B) organic acids having a ratio of not more than 5 noncarboxylic carbon atoms for each carboxylic carbon atom, by contacting (I) and (II) in liquid phase.

18. A process for the preparation of soluble polyaminoalkyl-substituted organosiloxane copolymers which comprises reacting (1) a compound of the formula

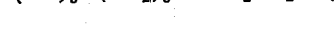

where each R is an alkyl radical of less than 4 carbon atoms, with (2) an organosiloxane consisting essentially of polymeric units of the formula

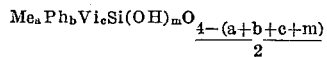

where

Me, ph and Vi represent methyl, phenyl and vinyl radicals respectively, $a$ is an integer of from 0–3 inclusive, $b$ is an integer of from 0–2 inclusive, $c$ is an integer of from 0–1 inclusive, the sum of $a+b+c$ is an integer of from 1 to 3 inclusive and has an average value of from 1 to 2.5 inclusive, $m$ is an integer of from 0 to 2 inclusive and has an average value such that (2) contains at least 1 percent by weight hydroxy groups, and the sum of $a+b+c+m$ is an integer of from 1 to 3 inclusive, by mixing (1) and (2) and heating the mixture in liquid phase at a temperature of at least 65° C.

References Cited

UNITED STATES PATENTS

| | | | |
|---|---|---|---|
| 2,754,311 | 7/1956 | Elliott | 260—448.2 |
| 2,972,598 | 2/1961 | Morehouse | 260—448.2 |
| 3,033,815 | 5/1962 | Pike et al. | 260—46.5 |
| 3,068,199 | 12/1962 | Sellers | 260—448.2 |

OTHER REFERENCES

Eaborn, Organosilicon Compounds, New York, Academic Press 1960, p. 238.

JAMES A. SEIDLECK, *Primary Examiner.*

SAMUEL H. BLECH, *Examiner.*

M. I. MARQUIS, *Assistant Examiner.*